United States Patent
Nagata et al.

(10) Patent No.: US 9,801,190 B2
(45) Date of Patent: Oct. 24, 2017

(54) RADIO COMMUNICATION SYSTEM, BASE STATION APPARATUS, USER TERMINAL AND RADIO COMMUNICATION METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 212 days.

(21) Appl. No.: 14/432,758

(22) PCT Filed: Aug. 19, 2013

(86) PCT No.: PCT/JP2013/072097
§ 371 (c)(1),
(2) Date: Apr. 1, 2015

(87) PCT Pub. No.: WO2014/054344
PCT Pub. Date: Apr. 10, 2014

(65) Prior Publication Data
US 2015/0264694 A1    Sep. 17, 2015

(30) Foreign Application Priority Data

Oct. 3, 2012  (JP) ................................. 2012-221586

(51) Int. Cl.
*H04W 72/08* (2009.01)
*H04W 24/10* (2009.01)
(Continued)

(52) U.S. Cl.
CPC ......... *H04W 72/082* (2013.01); *H04L 1/0026* (2013.01); *H04L 5/0035* (2013.01);
(Continued)

(58) Field of Classification Search
CPC .............................. H04W 24/10; H04L 1/0026
See application file for complete search history.

(56) References Cited

U.S. PATENT DOCUMENTS

| | | | |
|---|---|---|---|
| 2011/0080965 A1* | 4/2011 | Liu | ...................... H04L 25/0224 375/260 |
| 2011/0222457 A1* | 9/2011 | Lee | ........................ H04W 28/06 370/312 |

(Continued)

FOREIGN PATENT DOCUMENTS

WO    2013-169197 A1    11/2013

OTHER PUBLICATIONS

Extended European Search Report in counterpart European Patent Application No. 13843506.0, dated Sep. 22, 2016 (11 pages).

(Continued)

*Primary Examiner* — Christopher Crutchfield
(74) *Attorney, Agent, or Firm* — Osha Liang LLP (57) ABSTRACT

The present invention is designed to provide a radio communication system, a base station apparatus, a user terminal and a radio communication method, whereby, when a plurality of kinds of CSI processes are configured, it is possible to lighten the processing load, and, furthermore, reduce the deterioration of throughput performance. The radio communication method of the present invention includes a plurality of base station apparatuses that transmit CSI-RSs for measuring CSI and a user terminal that communicates with the plurality of base station apparatuses, and, when a plurality of CSI processes, which are combinations of SMRs and IMRs, are configured, in each of the base station apparatuses, a CSI process for requesting CSI with a nearest CSI reference resource in a subframe of the subframe number N-4 or an earlier subframe is configured, and in the user terminal, the CSI process configured in each of the base station apparatuses is determined, and, the CSI feedback process is performed based on the determination.

19 Claims, 7 Drawing Sheets

(51) Int. Cl.
  *H04W 28/16*  (2009.01)
  *H04L 25/02*  (2006.01)
  *H04L 5/00*   (2006.01)
  *H04L 1/00*   (2006.01)

(52) U.S. Cl.
  CPC ......... *H04L 25/0224* (2013.01); *H04W 24/10* (2013.01); *H04W 28/16* (2013.01); *H04L 5/001* (2013.01)

(56) References Cited

U.S. PATENT DOCUMENTS

| | | | | |
|---|---|---|---|---|
| 2012/0281567 | A1* | 11/2012 | Gao | H04B 7/0626 370/252 |
| 2013/0039231 | A1* | 2/2013 | Wang | H04W 72/10 370/280 |
| 2014/0078919 | A1* | 3/2014 | Hammarwall | H04L 5/0057 370/252 |
| 2014/0293914 | A1* | 10/2014 | Maattanen | H04W 72/1278 370/329 |

OTHER PUBLICATIONS

NTT DOCOMO,; "Impact of Restriction on CoMP CSI processing" 3GPP TSG RAN WG1 Meeting #70bis, R1-124560, San Diego, USA, Oct. 8-12, 2012 (6 pages).

International Search Report for corresponding International Application No. PCT/JP2013/072097, dated Oct. 29, 2013 (2 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action issued in corresponding Japanese Application No. 2012-221586, dated Oct. 20, 2015 (11 pages).

Renesas Mobile Europe Ltd; "Limiting UE CSI feedback processing complexity"; 3GPP TSG-RAN WG1 Meeting #70, R1-123578; Qingdao, China; Aug. 13-17, 2012 (4 pages).

Qualcomm Incorporated; "Remaining details of the size of the coMP measurement set"; 3GPP TSG-RAN WG1 Meeting #70, R1-123683; Qingdao, China; Aug. 13-17, 2012 (5 pages).

* cited by examiner

RADIO COMMUNICATION SYSTEM, BASE STATION APPARATUS, USER TERMINAL AND RADIO COMMUNICATION METHOD

TECHNICAL FIELD

The present invention relates to a radio communication system, a base station apparatus, a user terminal and a radio communication method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by employing HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, successor systems of the LTE system are also under study for the purpose of achieving further broadbandization and higher speed (referred to as, for example, "LTE-advanced" or "LTE-enhancement" (hereinafter referred to as "LTE-A")).

In the downlink of the LTE system (for example, Rel. 8 LTE), CRSs (Cell-specific Reference Signals), which are associated with cell IDs, are defined. These CRSs are used to demodulate user data, and, in addition, used to measure downlink channel quality (CQI: Channel Quality Indicator) for scheduling and adaptive control, and so on. Meanwhile, in the downlink of successor systems of LTE (for example, Rel. 10 LTE), CSI-RSs (Channel State Information-Reference Signals) are under study as reference signals for dedicated use of measuring CSI (Channel State Information).

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminals UE (User Equipment) in the frequency domain. Meanwhile, between cells, like in W-CDMA, interference randomization by one-cell frequency re-use is fundamental.

So, in the 3GPP (3rd Generation Partnership Project), coordinated multi-point transmission/reception (CoMP) techniques are under study as techniques to realize inter-cell orthogonalization. In this CoMP transmission/reception, a plurality of cells coordinate and perform signal processing for transmission and reception for one user terminal UE or for a plurality of user terminals UE. By employing these CoMP transmission/reception techniques, improvement of throughput performance is expected, especially with respect to user terminals UE located on cell edges.

In this way, in the LTE-A system, there are transmission modes to transmit from a plurality of transmission points to a user terminal, in addition to transmission modes to transmit from one transmission point to a user terminal. When the CoMP transmission in Rel. 11 LTE is employed, it is possible to configure a plurality of kinds of CSI-RSs for one user terminal, and therefore there is a possibility that more than one CSI process is required per user terminal. Meanwhile, on the user terminal side, there is a problem that, when an attempt is made to feed back a plurality of kinds of CSI while a plurality of kinds of CSI processes are configured, the calculation of the plurality of kinds of CSI costs increased processing load.

In order to solve this problem, a study is in progress in which, when a plurality of kinds of CSI processes (combinations of signal measurement resources and interference measurement resources) are configured and CSI feedback is sent periodically or aperiodically in subframe number N, the CSI is calculated using a radio resource that is farther apart in time than heretofore, so as to lighten the processing load. However, if CSI is calculated in this way using a radio resource that is farther apart in time than heretofore, the throughput performance may deteriorate.

The present invention has been made in view of the above, and it is therefore an object of the present invention to provide a radio communication system, a base station apparatus, a user terminal and a radio communication method that can lighten the processing load and that can furthermore reduce the deterioration of throughput performance when a plurality of kinds of CSI processes are configured.

Solution to Problem

The radio communication system of the present invention is a radio communication system in which a plurality of channel state information processes, which are combinations of signal measurement resources and interference measurement resources, are configured, the radio communication system includes a plurality of base station apparatuses that transmit channel state information reference signals for measuring channel states, and a user terminal that communicates with the plurality of base station apparatuses, the base station apparatuses each include a configuring section that configures a channel state information process for requesting channel state information with a nearest channel state information reference resource in a subframe that is four or more subframes before a subframe identified by a subframe number, and the user terminal includes a determining section that determines the channel state information process configured in the base station apparatuses, and a feedback processing section that preforms a channel state information feedback process based on the determination.

Technical Advantage of the Invention

According to the present invention, when a plurality of kinds of CSI processes are configured, it is possible to lighten the processing load, and, furthermore, reduce the deterioration of throughput performance.

DESCRIPTION OF EMBODIMENTS

First, CSI-RSs, which are one kind of reference signals employed in successor systems of LTE (for example, Rel. 10 LTE), will be described. CSI-RSs (Channel State Information-Reference Signals) are reference signals that are used to measure channel quality information (CSI: Channel State Information) such as CQIs (Channel Quality Indicators), PMIs (Precoding Matrix Indicators), RIs (Rank Indicators) and so on as channel states. Unlike CRSs that are allocated to all subframes, CSI-RSs are allocated in a predetermined cycle—for example, in a ten-subframe cycle. Also, CSI-RSs are specified by parameters such as positions, sequences and transmission power. The positions of CSI-RSs include subframe offset, cycle, and subcarrier-symbol offset (index).

Note that, as CSI-RSs, non-zero-power CSI-RSs and zero-power CSI-RSs are defined. With non-zero-power CSI-RSs, transmission power is distributed over the resources where the CSI-RSs are allocated, while, with zero-power CSI-RSs, transmission power is not distributed over the resources where the CSI-RSs are allocated (that is, the CSI-RSs are muted).

In one subframe defined in LTE, CSI-RSs are allocated not to overlap with control signals such as the PDCCH (Physical Downlink Control Channel), user data such as the PDSCH (Physical Downlink Shared Channel), and other reference signals such as CRSs (Cell-specific Reference Signals) and DM-RSs (Demodulation-Reference Signals). One subframe is formed with twelve subcarriers that are consecutive in the frequency direction and fourteen symbols (one resource block (RB) pair) that are consecutive in the time axis direction. As the resources where CSI-RSs can be allocated, two resource elements that neighbor each other along the time axis direction are allocated in sets, from the perspective of suppressing the PAPR.

These reference resources of these CSI-RSs (radio resources for calculating CSI) are defined as follows.

Figure 1A:
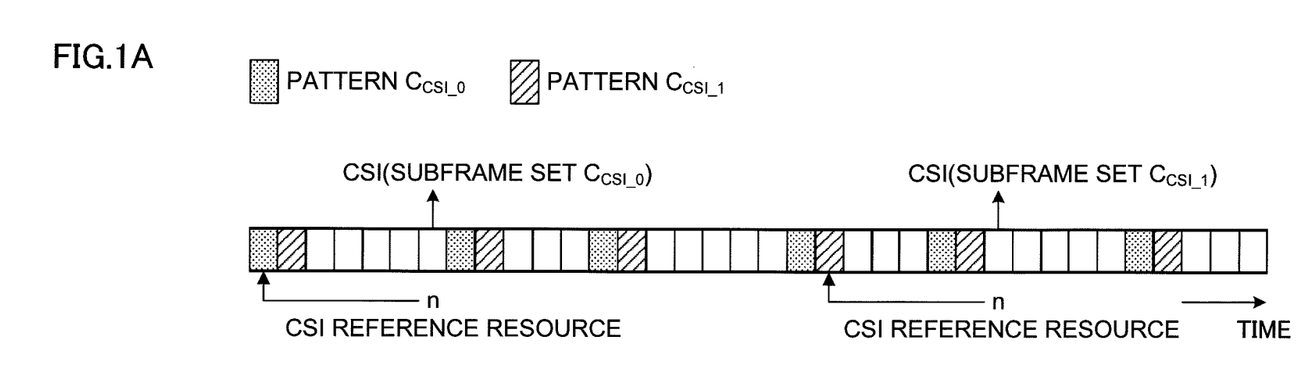
FIG. 1 provides diagrams to explain CSI reference resources.

First, a base station apparatus can configure, for example, two kinds of subframe sets for interference coordination in a heterogeneous network and so on, for a user terminal. For example, as shown in FIG. 1A, the base station apparatus can configure two kinds of subframe sets (patterns $C_{CSI\_0}$ and $C_{CSI\_1}$). In this case, when CSI feedback is transmitted periodically in the PUCCH (Physical Uplink Control Channel), the cycle and so on are configured for each subframe set separately. For example, when the CSI of $C_{CSI\_0}$ is fed back in subframe N, the CSI is calculated using nearest $C_{CSI\_0}$ in a subframe that is four or more subframes before subframe n, as the CSI-RS reference resource. In FIG. 1A, CSI is calculated with the nearest $C_{CSI\_0}$ in a subframe that is six subframes before subframe N, as the CSI-RS reference resource.

Figure 1B:
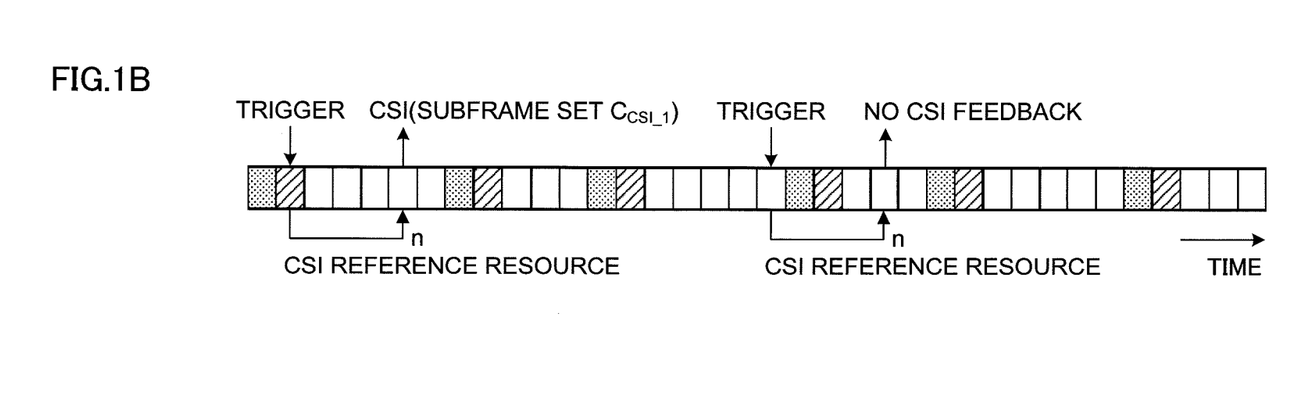

Also, when CSI feedback is transmitted aperiodically in the PUSCH (Physical Uplink Shared Channel), the CSI of the CSI-RS reference resource that includes the triggered subframe is calculated. In FIG. 1B, the CSI of the CSI-RS reference resource including the triggered subframe (which is four subframes back from subframe n) is calculated. Consequently, the base station apparatus needs to provide a trigger in accordance with the time of the subframe set the CSI of which is desired. If the subframe that is triggered belongs to no subframe set, no CSI is fed back (FIG. 1B).

Also, in the LTE-A system, there is a transmission mode to transmit from a plurality of transmission points to a user terminal, so that the accuracy of interference measurement becomes important when calculating CSI from CSI-RSs.

For example, CoMP transmission is a mode of transmission from a plurality of transmission points. Downlink CoMP transmission includes coordinated scheduling/coordinated beamforming, and joint processing. Coordinated scheduling/coordinated beamforming refers to a method of transmitting a shared data channel from only one cell to one user terminal UE, and, allocates radio resources in the frequency/space domain, taking into account interference from other cells, interference against other cells and so on. Meanwhile, joint processing refers to a method of transmitting a shared data channel from a plurality of cells all at the same time by applying precoding, and includes joint transmission to transmit a shared data channel from a plurality of cells to one user terminal UE, and dynamic point selection to select one cell dynamically and transmit a shared data channel. There is also a transmission mode referred to as "dynamic point blanking (DPB)," which stops data transmission in a certain region with respect to a transmission point that causes interference.

In CoMP transmission, a plurality of cells coordinate and carry out signal processing for transmission/reception, so that a plurality of kinds of CSI are required for one user terminal. For example, when DPS is employed between transmission point (TP) #1 and TP #2, two kinds of information—namely, the CSI between the user terminal UE and TP #1 and the CSI between the user terminal UE and TP #2—are necessary. Here, the CSI refers to RI (Rank Indicator), subband PMI, wideband PMI, subband CQI, wideband CQI and so on.

Figure 2:
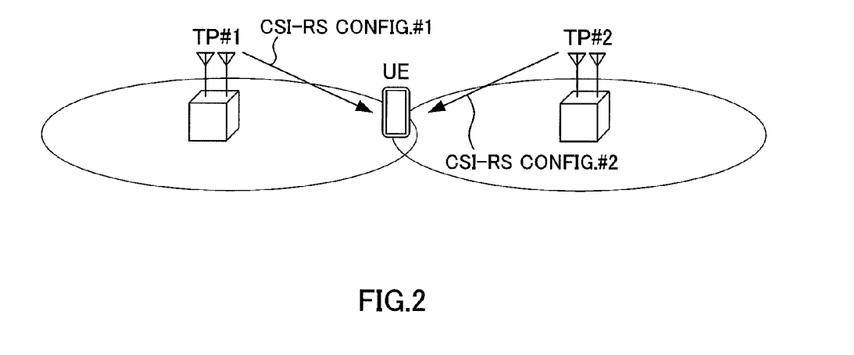
FIG. 2 is a diagram to show examples of CSI-RSs that are transmitted from a plurality of transmission points.

In Rel. 11 LTE CoMP, taking into account the above points, it became possible to configure a plurality of kinds of CSI-RSs for one user terminal. By this means, a user terminal sends a plurality of kinds of CSI feedbacks by using a plurality of kinds of CSI-RSs that are configured. When, for example, DPS is employed between TP #1 and TP #2 as shown in FIG. 2, it may occur that two kinds of CSI-RSs—namely, the CSI-RS transmitted from TP #1 (CSI-RS configuration #1) and the CSI-RS transmitted from TP #2 (CSI-RS configuration #2)—are configured in one user terminal UE, and the user terminal UE feeds back two kinds of CSI, which are requested with the two kinds of CSI-RSs that are configured, respectively.

Also, with a Rel. 11 LTE CoMP UE, a study is in progress to calculate the signal component of CSI by using the resource element (RE) of the non-zero power CSI-RS, and calculate the interference component of CSI by using PDSCH (Physical Downlink Shared Channel) muting technique (for example, REs of zero power CSI-RS). Here, the radio resource for calculating the signal component of CSI (for example, the radio resource configured by the non-zero power CSI-RS) will be referred to as the "Signal Measurement Resource (SMR)", and the radio resource for calculating the interference component (for example, the radio resource configured by using PDSCH muting technique) will be referred to as the "Interference Measurement Resource (IMR)."

Figure 3:
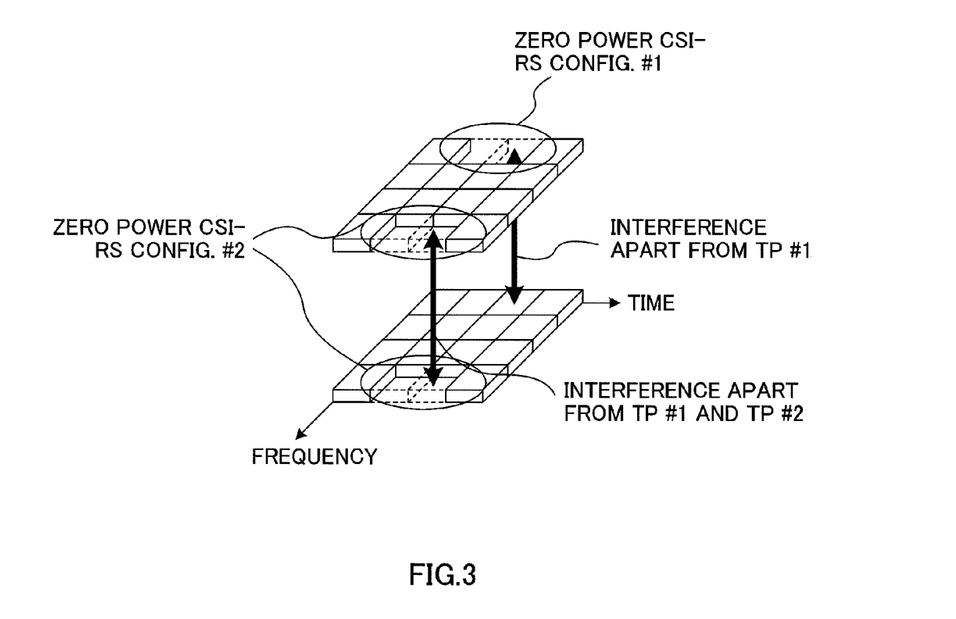
FIG. 3 is a diagram to explain interference measurement using PDSCH muting technique.

As shown in FIG. 3, interference measurement using PDSCH muting technique refers to the technique of measuring interference, so as to allow a user terminal to determine CSI, by not transmitting (muting) the PDSCH region from neighboring transmission points TP. For example, in FIG. 3, TP #1 configures zero power CSI-RS configuration #1 and makes a certain region of the PDSCH not subject to transmission, so that a user terminal is able to determine the interference signal power, which is given by removing the received signal from TP #1 from the overall received signal power, and TP #1 and TP #2 configure zero power CSI-RS configuration #2 and makes a certain region of the PDSCH not subject to transmission in both, so that the user terminal is able to determine the interference signal power, which is given by removing the received signals from TP #1 and TP #2 from the overall received signal power.

A CoMP UE in Rel. 11 LTE calculates the signal component of CSI from the SMR, and calculates the interference component of CSI from the IMR. Also, a study is in progress in which the base station apparatus reports information about the combinations of SMRs (for example, non-zero power CSI-RS REs, CRS REs and so on) and IMRs (for example, zero power CSI-RS REs) to the user terminal through, for example, higher layer signaling (for example, by using RRC signaling, broadcast information and so on). Here, the information of the combinations of SMRs and IMRs will be referred to as "CSI processes" when necessary.

The user terminal performs the process of calculating CSI based on the CSI process that is configured, and feeds back the requested CSI. In CoMP transmission in Rel. 11 LTE, it is possible to configure a plurality of kinds of CSI-RSs for one user terminal, so that there is a possibility that more than one CSI process is involved per user terminal. Meanwhile, on the user terminal side, there is a problem that, if an attempt is made to feed back a plurality of kinds of CSI while a plurality of kinds of CSI processes are configured, the processing load for calculating the plurality of kinds of CSI increases.

In order to solve this problem, when a plurality of kinds of CSI processes are configured and CSI feedback is sent periodically or aperiodically in subframe number N, instead of calculating CSI using the nearest CSI reference resource in the subframe of the subframe number N-4 or in a subframe that is earlier in time than the subframe of the subframe number N-4, there is a proposal to calculate CSI using a nearest CSI reference resource in a subframe that is even earlier in time—for example, the subframe that is identified by the subframe number N-6 or is earlier in time than the subframe identified by the subframe number N-6 —.

When, as described above, CSI is calculated using the nearest CSI reference resource in a subframe that is earlier in time than the subframe of the subframe number N-4 (for example, the subframe of the subframe number N-6 or an earlier subframe), this means that the CSI is calculated using a radio resource that is farther apart in time than heretofore, compared to a radio resource where data is allocated, and therefore the throughput performance may deteriorate. For example, if the CSI with respect to the serving TP is calculated using the subframe of the subframe number N-6 or an earlier subframe, this means that the CSI is calculated using a CSI reference resource in the subframe that goes two subframes or more farther back than heretofore, and therefore the throughput performance when data is transmitted from the serving TP deteriorates more than heretofore.

The present inventors have found out that, when a plurality of kinds of CSI processes are used, by calculating CSI using the nearest CSI reference resource for CSI where deterioration of throughput performance is undesirable, in a subframe (identified by the subframe number N-4 or earlier) that is four or more subframes earlier in time than a subframe identified by the subframe number, and by calculating CSI using the nearest CSI reference resource for CSI where deterioration of throughput performance can be tolerated, in a subframe that is earlier in time than the subframe of the subframe number N-4 (for example, the subframe of the subframe number N-6 or an earlier subframe), it is possible to lighten the processing load for calculating a plurality of kinds of CSI, and, furthermore, prevent the deterioration of throughput performance with respect to specific CSI processes, and thereupon arrived at the present invention.

According to the present invention, a plurality of kinds of CSI processes are configured, and, when CSI is calculated using the nearest CSI reference resource in a subframe that is earlier in time than the subframe of the subframe number N-4 (for example, the subframe of the subframe number N-6 or an earlier subframe) and, with respect to CSI processes that are determined in advance, channel quality information is calculated using the nearest CSI reference resource in a subframe of the subframe number N-4 or an earlier subframe (the same as heretofore). That is to say, for CSI processes that are configured in advance, the nearest CSI reference resource in a subframe of the subframe number N-4 or an earlier subframe is used (the same as heretofore).

The above configured CSI processes are reported from the base station apparatus to user terminals by the following two methods:

(First Reporting Method) Implicit Signaling

The CSI processes for calculating CSI using the nearest CSI reference resource in a subframe of the subframe number N-4 or an earlier subframe are determined by a user terminal in accordance with predetermined rules. For example, for the CSI process that corresponds to the CSI process index (which is an index that is assigned to each CSI processes) of the youngest number, the CSI is calculated using the nearest CSI reference resource (that is earlier in time) in a subframe of the subframe number N-4 or an earlier subframe. In this way, CSI processes that are configured in advance are associated with conventional information. By this means, it is possible to skip signaling, and report configured CSI processes from a base station apparatus to a user terminal by sending conventional information.

The above predetermined rules may be determined to be one of or combinations of the following rules (1) to rule (6).

<Rule (1)>

For the CSI process that corresponds to the CSI process index of the youngest number (or multiple numbers that are determined in advance), the CSI is calculated using the nearest CSI reference resource in a subframe of the subframe number N-4 or an earlier subframe, and, as for the CSI processes that correspond to CSI process indices of other numbers, the CSI is calculated using the nearest CSI reference resource in a subframe that is earlier in time than the subframe of the subframe number N-4 (for example, the subframe of the subframe number N-6 or an earlier subframe). For example, by making the CSI process that corresponds to the CSI process index of the youngest number a CSI process to correspond to single-TP transmission from the serving TP, it becomes possible to make the throughput performance of single-TP transmission the same as heretofore.

<Rule (2)>

Priorities are assigned to every CSI process (or every several CSI processes), and, based on the priorities determined thus, for the CSI process of the highest priority (or multiple priorities that are determined in advance), the CSI is calculated using the nearest CSI reference resource in a subframe of the subframe number N-4 or an earlier subframe, and, as for the other CSI processes, the CSI is calculated using the nearest CSI reference resource in a subframe that is earlier in time than the subframe of the subframe number N-4 (for example, the subframe of the subframe number N-6 or an earlier subframe). For example, assuming that priorities are assigned by classifying between the CSI process as of when one kind of CSI process is configured for one user terminal (which may be defined as, for example, "primary CSI process") and the CSI process group as of when two or more kinds of CSI processes are configured for one user terminal (which may be defined as, for example, "secondary CSI processes") and arrangements are made to prioritize the primary CSI process, the user terminal calculates the CSI, for the CSI process of the primary CSI process, using the nearest CSI reference resource in a subframe of the subframe number N-4 or an earlier subframe, and calculates the CSI, for the CSI processes corresponding to the secondary CSI processes, using the nearest CSI reference resource in a subframe that is earlier in time than the subframe of the subframe number N-4 (for example, the subframe of the subframe number N-6 or an earlier subframe).

<Rule (3)>

For the CSI process that corresponds to the CC (Component Carrier) index (which is an index that is assigned to every component carrier) of the youngest number (or multiple numbers that are determined in advance), the CSI is calculated using the nearest CSI reference resource in a subframe of the subframe number N-4 or an earlier subframe, and, for the CSI processes corresponding to CC indices of other numbers, the CSI is calculated using the nearest CSI reference resource in a subframe that is earlier in time than the subframe of the subframe number N-4 (for example, the subframe of the subframe number N-6 or an earlier subframe). For example, by making the CSI process corresponding to the CC index of the youngest number a CSI process to correspond to the PCC (Primary Component Carrier), it is possible to make the throughput performance in the PCC the same as hereto fore.

<Rule (4)>

Priorities are assigned to every CC index (or to every several CC indices), and, based on the priorities determined thus, for the CSI process that corresponds to the highest priority (or multiple priorities that are determined in advance), the CSI is calculated using the nearest CSI reference resource in a subframe of the subframe number N-4 or an earlier subframe. For example, by making the priority of the PCC higher than that of the SCCs (Secondary Component Carriers), the user terminal calculates CSI for the CSI process that corresponds to the PCC using the nearest CSI reference resource in a subframe of the subframe number N-4 or an earlier subframe, and calculates CSI for the CSI processes that correspond to the SCC group using the nearest CSI reference resource in a subframe that is earlier in time than the subframe of the subframe number N-4 (for example, the subframe of the subframe number N-6 or an earlier subframe).

<Rule (5)>

For the CSI process that corresponds to the reporting type that is prioritized the most (or multiple reporting types that are determined in advance) among the reporting types, the CSI is calculated using the nearest CSI reference resource in a subframe of the subframe number N-4 or an earlier subframe, and, for the CSI processes corresponding to the other reporting types, the CSI is calculated using the nearest CSI reference resource in a subframe that is earlier in time than the subframe of the subframe number N-4 (for example, the subframe of the subframe number N-6 or an earlier subframe). For example, priorities are assigned based on the reporting type dropping rules written in the TS36.213, section 7.2.2 ("Periodic CSI Reporting using PUCCH"), and, for the CSI processes that correspond to reporting types that rank high and are prioritized, the CSI is calculated using the nearest CSI reference resource in a subframe of the subframe number N-4 or an earlier subframe, and, as for the CSI processes that correspond to the other reporting types, the CSI is calculated using the nearest CSI reference resource in a subframe that is earlier in time than the subframe of the subframe number N-4 (for example, the subframe of the subframe number N-6 or an earlier subframe).

<Rule (6)>

Priorities are assigned to CSI processes based on information about the CSI processes, and, for the CSI process that corresponds to the information that is prioritized the most (or multiple pieces of information that are determined in advance), the CSI is calculated using the nearest CSI reference in a subframe of the subframe number N-4 or an earlier subframe.

(a) For example, priorities may be assigned such that the priority of the SMR is higher than that of the IMR, or (b) Priorities may be assigned such that the priority of the CRS is higher than that of the CSI-RS/zero power CSI-RS, based on, for example, the RS of the object that is subject to signal measurement, interference measurement and so on.

In the event of above (a), with respect to the SMR, the CSI is calculated using the nearest CSI reference resource in a subframe of the subframe number N-4 or an earlier subframe, and with respect to the IMR, the CSI is calculated using the nearest CSI reference resource in a subframe that is earlier in time than the subframe of the subframe number N-4 (for example, the subframe of the subframe number N-6 or an earlier subframe).

In the event of above (b), it may be possible to, for example, prioritize the CRS RE compared to the non-zero power CSI-RS RE as the SMR, or prioritize the case where, for example, as the IMR, the zero power CSI-RS RE is not configured ("not configured" here means that, for example, (conventional) CRS-based interference measurement is executed), compared to the case where the zero power CSI-RS RE is configured. In this case, for example, when the following two kinds of CSI processes are configured for a user terminal, while CSI process #2 is prioritized compared to CSI process #1, and the CSI corresponding to CSI processes #2 is calculated using the nearest CSI reference resource in a subframe of the subframe number N-4 or an earlier subframe, the CSI corresponding to CSI process #1 is calculated using the nearest CSI reference resource in a subframe of the subframe number N-6 or an earlier subframe.

CSI process #1: The CSI-RS RE is designated as the SMR, and the zero power CSI-RS RE is designated as the IMR.

CSI process #2: The CRS RE is designated as the SMR, and the zero power CSI-RS RE is not configured as the IMR (which means that conventional (for example, CRS-based) interference measurement is executed).

(Second Reporting Method) Explicit Signaling

The CSI processes, the CSI of which is calculated using the nearest CSI reference resource in a subframe of the subframe number N-4 or an earlier subframe, are signaled using higher layer signaling (RRC signaling, broadcast signals and so on) or dynamic signaling (for example, signaling using the PDCCH, signaling using the ePDCCH (enhanced PDCCH) that is multiplexed in the PDSCH region, and so on). That is to say, CSI processes that are configured in a base station apparatus are reported to a user terminal.

The signaling method of explicit signaling may be determined to be one of or combinations of the following signaling (1) to signaling (3).

<Signaling (1)>

Whether or not to calculate CSI using the nearest CSI reference resource in a subframe of the subframe number N-4 or an earlier subframe is signaled in CSI process units (or in units of multiple CSI processes). With respect to a CSI process that is reported, a user terminal calculates the CSI using the nearest CSI reference resource in a subframe of the subframe number N-4 or an earlier subframe.

<Signaling (2)>

Whether or not to calculate CSI using the nearest CSI reference resource in a subframe of the subframe number N-4 or an earlier subframe is signaled in CC index units (or in units of multiple CC indices). With respect to a CC index that is reported, a user terminal calculates the CSI using the nearest CSI reference resource in a subframe of the subframe number N-4 or an earlier subframe.

<Signaling (3)>

Whether or not to calculate CSI using the nearest CSI reference resource in a subframe of the subframe number N-4 or an earlier subframe is signaled in reporting type units (or in units of multiple reporting types). With respect to a reporting type that is reported, a user terminal calculates the CSI using the nearest CSI reference resource in a subframe of the subframe number N-4 or an earlier subframe.

In the radio communication system according to the present invention, various kinds of information need to be reported between base station apparatuses and user terminals.

A user terminal may report information (capability information) as to whether or not the user terminal is capable of receiving a plurality of kinds of CSI processes, or as to for how many CSI processes (maximum number of CSI processes) the user terminal is capable of calculating CSI using the nearest CSI reference resource in a subframe of the subframe number N-4 or an earlier subframe, to a base station apparatus. For example, the user terminal reports to the base station apparatus that the user terminal is capable of receiving a plurality of kinds of CSI processes and is capable of calculating CSI, for four or fewer CSI processes, using the nearest CSI reference resource in a subframe of the subframe number N-4 or an earlier subframe.

In this case, the base station apparatus decides whether or not to configure a plurality of kinds of CSI processes for the user terminal, based on the information reported from the user terminal, and, when CSI is calculated using the nearest CSI reference resource in a subframe that is earlier in time than the subframe of the subframe number N-4 (for example, the subframe of the subframe number N-6 or an earlier subframe), may also decide, with respect to CSI that is configured in advance, whether or not to calculate the CSI using the nearest CSI reference resource in a subframe of the subframe number N-4 or an earlier subframe. That is to say, the base station apparatus configures the CSI process to request the CSI using the nearest CSI reference resource in a subframe of the subframe number N-4 or an earlier subframe based on the capability information reported from the user terminal.

Also, the base station apparatus may determine the assignment of priority in the above-described implicit signaling or explicit signaling based on information reported from the user terminal, or may determine for how many CSI processes the user terminal UE should calculate the CSI using the nearest CSI reference resource in a subframe of the subframe number N-4 or an earlier subframe. For example, when it is reported from the user terminal to the base station apparatus that CSI can be calculated using the nearest CSI reference resources in a subframe of the subframe number N-4 or an earlier subframe if the number of CSI processes is four or less, the base station apparatus, when employing explicit signaling, sends higher layer signaling to the effect that CSI be calculated using the nearest CSI reference resource in a subframe of the subframe number N-4 or an earlier subframe with respect to four or fewer CSI processes.

(Radio Communication System)

Here, the radio communication system according to the present embodiment will be described in detail. In this radio communication system, a plurality of base station apparatuses that transmit CSI-RSs for measuring CSI and a user terminal that communicates with the plurality of base station apparatuses are provided, and a plurality of CSI processes, which are combinations of SMRs and IMRs, are configured. The base station apparatuses configure the CSI processes for requesting the CSI using the nearest CSI reference resource in a subframe that is four or more subframes before a subframe identified by a subframe number, and the user terminal determines the CSI processes configured in the base station apparatus, and, based on this determination, performs the CSI feedback process.

Figure 4:
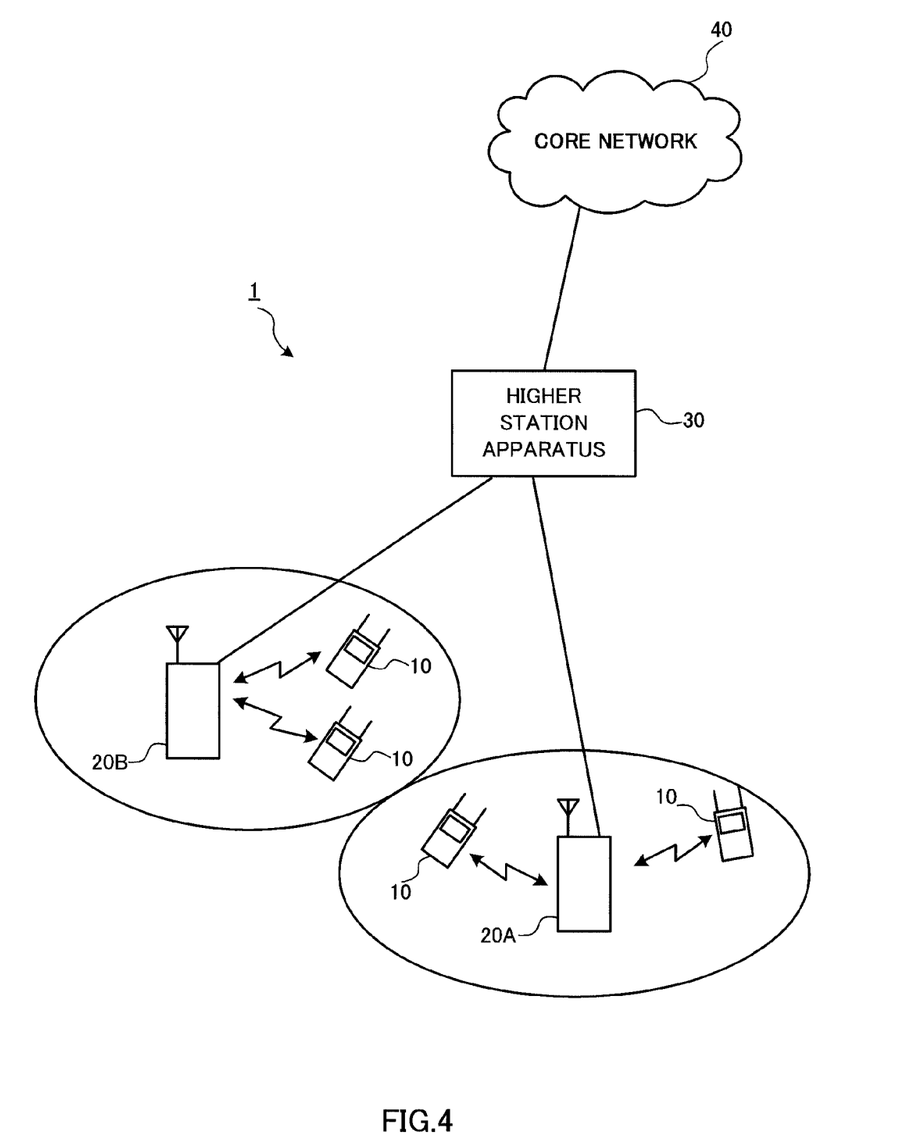
FIG. 4 is a diagram to explain a system structure of a radio communication system.

FIG. 4 is a diagram to explain the system structure of the radio communication system according to the present embodiment. Note that the radio communication system shown in FIG. 4 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 4, the radio communication system 1 is configured to include base station apparatuses 20A and 20B, which each serve as a transmission point, and user terminals 10 that communicate with these base station apparatuses 20A and 20B. The base station apparatuses 20A and 20B are connected with a higher station apparatus 30, and this higher station apparatus 30 is connected with a core network 40. Also, the base station apparatuses 20A and 20B are connected with each other by wire connection or by wireless connection. The user terminals 10 can communicate with the base station apparatuses 20A and 20B, which are transmission points. Note that the higher station apparatus 30 may be, for example, an access gateway apparatus, a radio network controller (RNC), a mobility management entity (MME) and so on, but is by no means limited to these.

Although the user terminals 10 may include both conventional terminals (Rel. 10 LTE) and support terminals (for example, Rel. 11 LTE), the following description will be given simply with respect to user terminals, unless specified otherwise. Also, the user terminals 10 will be described to perform radio communication with the base station apparatuses 20A and 20B for ease of explanation.

Note that, for radio access schemes in the radio communication system 1, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by the user terminals 10 on a shared basis as a downlink data channel, and downlink L1/L2 control channels (PDCCH, PCFICH, PHICH). Transmission data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

Uplink communication channels include a PUSCH (Physical Uplink Shared Channel), which is used by each user terminal on a shared basis as an uplink data channel, and a PUCCH (Physical Uplink Control Channel), which is an uplink control channel. By means of this PUSCH, transmission data and higher control information are transmitted. Also, downlink channel state information (CSI (including CQI and/or the like)), ACK/NACK and so on are transmitted by the PUCCH.

Figure 5:
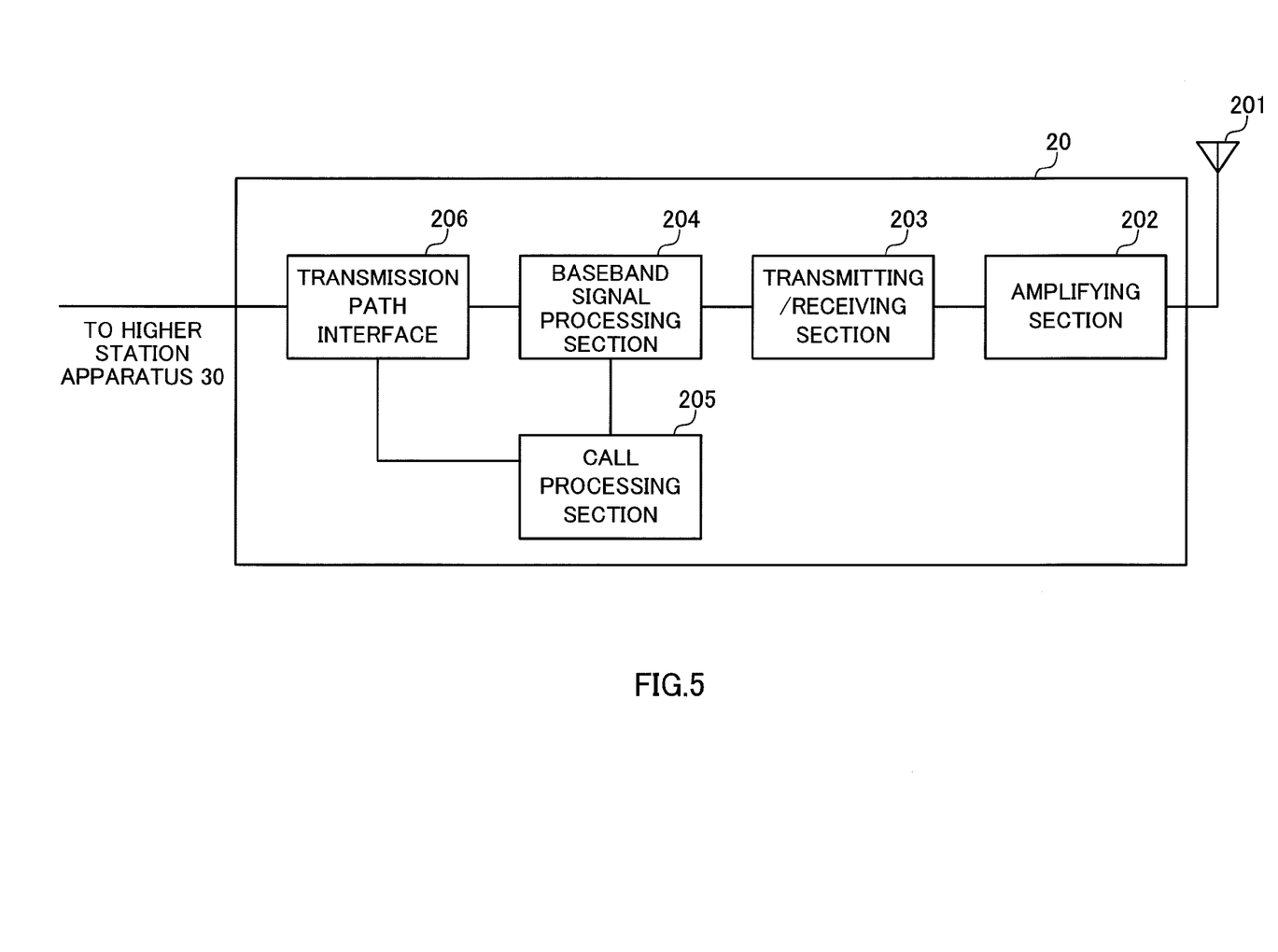
FIG. 5 is a diagram to explain an overall structure of a base station apparatus.

An overall structure of a base station apparatus according to the present embodiment will be described with reference to FIG. 5. Note that the base station apparatuses 20A and 20B are structured alike and therefore will be described as the "base station apparatus 20." The base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the user terminal on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to carry out radio communication with the base station apparatus 20, to the user terminals 10 that are connected to the same transmission point, by a broadcast channel. The information for allowing communication in the transmission point includes, for example, the uplink or downlink system bandwidth, root sequence identification information (root sequence indices) for generating random access preamble signals in the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal having been subjected to frequency conversion, and output the result to the transmitting/receiving antenna 201.

On the other hand, as for a signal to be transmitted from the user terminal 10 to the base station apparatus 20 on the uplink, a radio frequency signal that is received in the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20, and manages the radio resources.

Next, an overall structure of a user terminal according to the present embodiment will be described with reference to FIG. 6. A user terminal 10 has a transmitting/receiving antenna 101, an amplifying section 102, a transmitting/receiving section (receiving section) 103, a baseband signal processing section 104 and an application section 105.

As for downlink data, a radio frequency signal that is received in the transmitting/receiving antenna 101 is amplified in the amplifying section 102, and converted into a baseband signal through frequency conversion in the transmitting/receiving section 103. This baseband signal is subjected to an FFT process, error correction decoding, a retransmission control receiving process and so on in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 7:
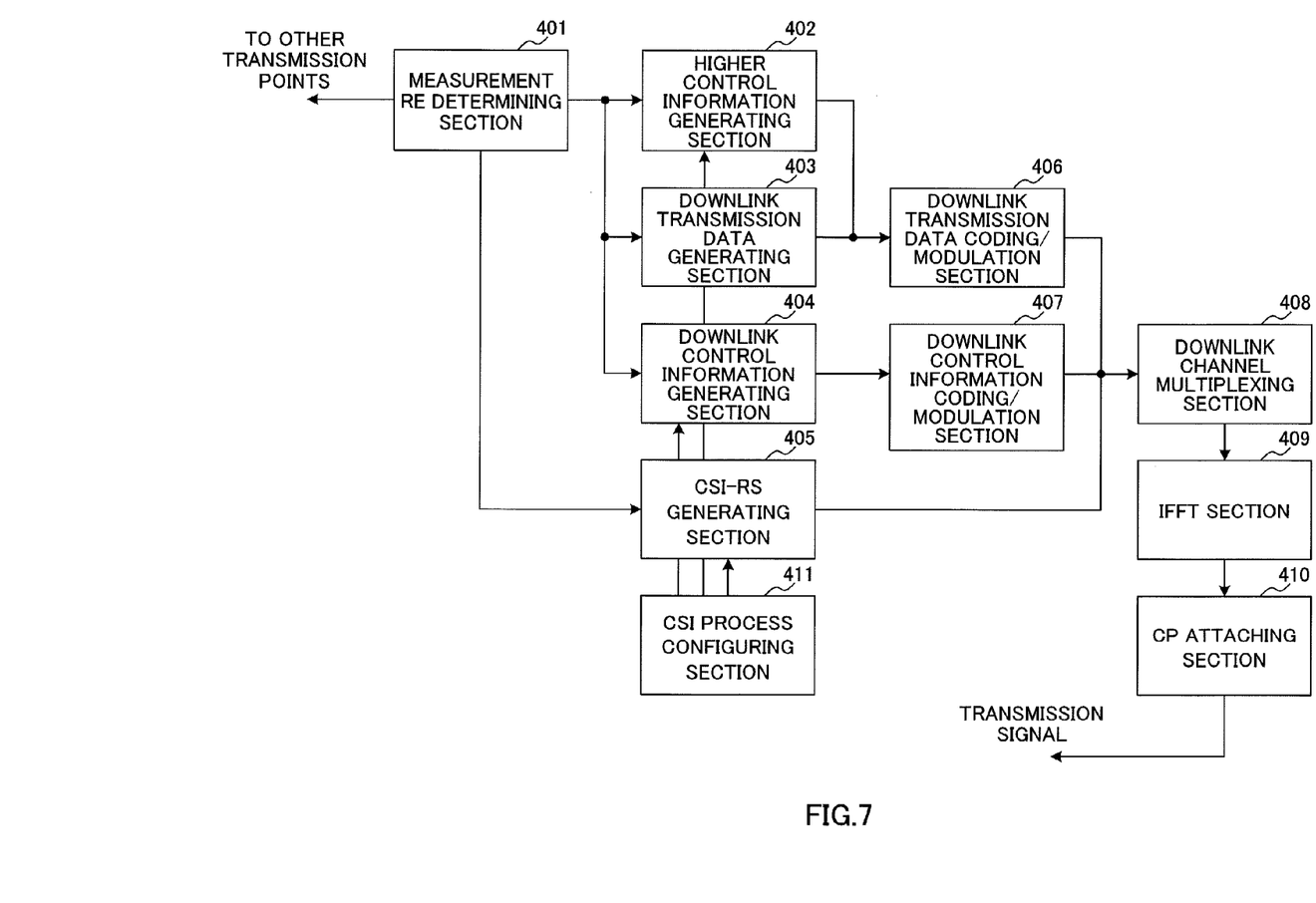
FIG. 7 is a functional block diagram of a base station apparatus.

The function blocks of the base station apparatus pertaining to the process of configuring CSI processes will be described with reference to FIG. 7. Note that the function blocks of FIG. 7 primarily relate to the baseband signal processing section shown in FIG. 5. Also, although the functional block diagram of FIG. 7 is simplified to explain the present invention, assume that the configurations which a baseband signal processing section should normally have are provided.

The base station apparatus 20 has, on the transmitting side, a measurement RE determining section 401, a higher control information generating section 402, a downlink transmission data generating section 403, a downlink control information generating section 404, a CSI-RS generating section 405, a downlink transmission data coding/modulation section 406, a downlink control information coding/modulation section 407 and a CSI process configuring section 411. Also, the base station apparatus 20 has a downlink channel multiplexing section 408, an IFFT section 409 and a CP attaching section 410.

The measurement RE determining section 401 determines the resource (SMR) for allocating the reference signal (CSI-RS) for measuring desired signals and the resource (IMR) for allocating the reference signal for measuring interference. Also, the measurement RE determining section 401 determines the combinations of the resource (measurement RE) for allocating the reference signal for measuring desired signals and the resource (measurement RE) for measuring interference signals.

Information (CSI-RS pattern information) regarding the allocation of the interference measurement CSI-RS and the desired signal measurement CSI-RS, when signaled to the user terminal semi-statically, is sent to the higher control information generating section 402 for higher layer signaling (for example, RRC signaling). Also, this allocation-related information, when signaled to the user terminal dynamically, is sent to the downlink control information generating section 404, so as to be included in downlink control information. Also, this allocation-related information is sent to the CSI-RS generating section 405 in order to generate CSI-RSs, and also sent to the downlink transmission data generating section 403 in order to make downlink transmission data zero-power (muted).

The higher control information generating section 402 generates higher control information to be transmitted and received by way of higher layer signaling (for example, RRC signaling, broadcast signals, etc.), and outputs the generated higher control information to the downlink transmission data coding/modulation section 406. For example, the higher control information generating section 402 generates higher control information (information related to CSI-RS transmission parameters) that includes the information output from the measurement RE determining section 401. Also, the higher control information generating section 402, when explicitly signaling the CSI process configured in the CSI process configuring section 411, generates higher control information that includes the CSI process.

The downlink transmission data generating section 403 generates downlink transmission data, and outputs this downlink transmission data to the downlink transmission data coding/modulation section 406. The downlink transmission data generating section 403 arranges the zero power CSI-RS in accordance with the allocation information output from the measurement RE determining section 401 (muting).

The downlink control information generating section 404 generates downlink control information, and outputs this downlink control information to the downlink control information coding/modulation section 407. The downlink transmission data coding/modulation section 406 performs channel coding and data modulation of the downlink transmission data and the higher control information, and outputs the results to the downlink channel multiplexing section 408. The downlink control information coding/modulation section 407 performs channel coding and data modulation of the downlink control information, and outputs the result to the downlink channel multiplexing section 408.

The CSI process configuring section 411 configures the CSI processes for requesting the CSI using the nearest CSI reference resource in a subframe that is four or more subframes before a subframe identified by a subframe number. The CSI process configuring section 411 configures the CSI processes based on, for example, above rule (1) to rule (6). When reporting the configured CSI processes to the user terminal explicitly, the CSI process configuring section 411 outputs information about the configured CSI processes to the higher control information generating section 402 and the downlink control information generating section 404. When the configured CSI processes are reported to the user terminal explicitly, information about the configured CSI process is reported in CSI process units, CC units and/or in reporting type units.

When the CSI processes configured in the CSI process configuring section 411 are reported to the user terminal implicitly, since, for example, the parameters defined in above rule (1) to rule (6) (CSI process indices, the priorities of CSI processes, CC indices, the priorities of CC indices, reporting types and/or the priorities of information related to CSI processes) and CSI processes are associated with each other, by reporting these parameters, in effect, CSI processes are reported.

The CSI-RS generating section 405 generates the desired signal measurement CSI-RS and the interference measurement CSI-RS in accordance with the allocation information output from the measurement RE determining section 401, and outputs these CSI-RSs to the downlink channel multiplexing section 408. Also, the CSI-RS generating section 405 configures the CSI reference resources based on the CSI processes output from the CSI process configuring section 411. For example, based on the CSI processes configured, the CSI-RS generating section 405 configures the nearest CSI reference resource in a subframe of the subframe number N-4 or an earlier subframe, or configures the nearest CSI reference resource in a subframe that is earlier in time than the subframe of the subframe number N-4 (for example, the subframe of the subframe number N-6 or an earlier subframe).

The downlink channel multiplexing section 408 generates a transmission signal by combining the downlink control information, the CSI-RSs, the higher control information and the downlink transmission data. The downlink channel multiplexing section 408 outputs the generated transmission signal to the IFFT section 409. The IFFT section 409 converts the transmission signal from a frequency domain signal to a time domain signal through an inverse fast Fourier transform (IFFT). The transmission signal after the IFFT is output to the CP attaching section 410. The CP attaching section 410 attaches CPs (Cyclic Prefixes) to the transmission signal after the IFFT, and outputs the transmission signal, to which CPs have been attached, to the amplifying section 202 shown in FIG. 5.

Figure 8:
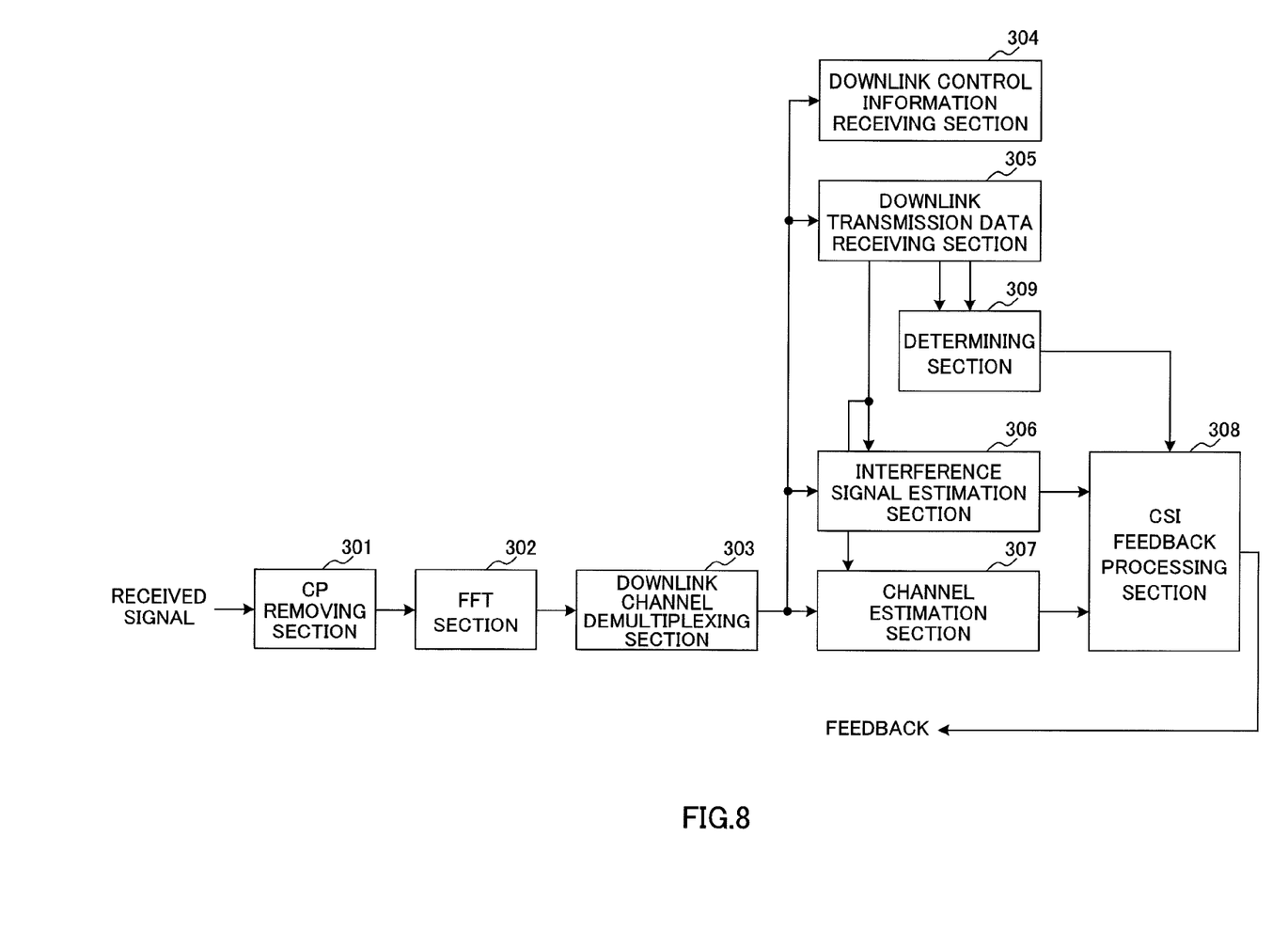
FIG. 8 is a functional block diagram of a user terminal.

The function blocks of the user terminal according to the present embodiment will be described with reference to FIG. 8. Note that the function blocks of FIG. 8 primarily relate to the baseband signal processing section 104 shown in FIG. 6. Also, although the function blocks shown in FIG. 8 are simplified to explain the present invention, assume that the configurations which a baseband signal processing section should normally have are provided.

The user terminal 10 has, on the receiving side, a CP removing section 301, an FFT section 302, a downlink channel demultiplexing section 303, a downlink control information receiving section 304, a downlink transmission data receiving section 305, an interference signal estimation section 306, a channel estimation section 307, a CSI feedback processing section 308 and a determining section 309.

Figure 6:
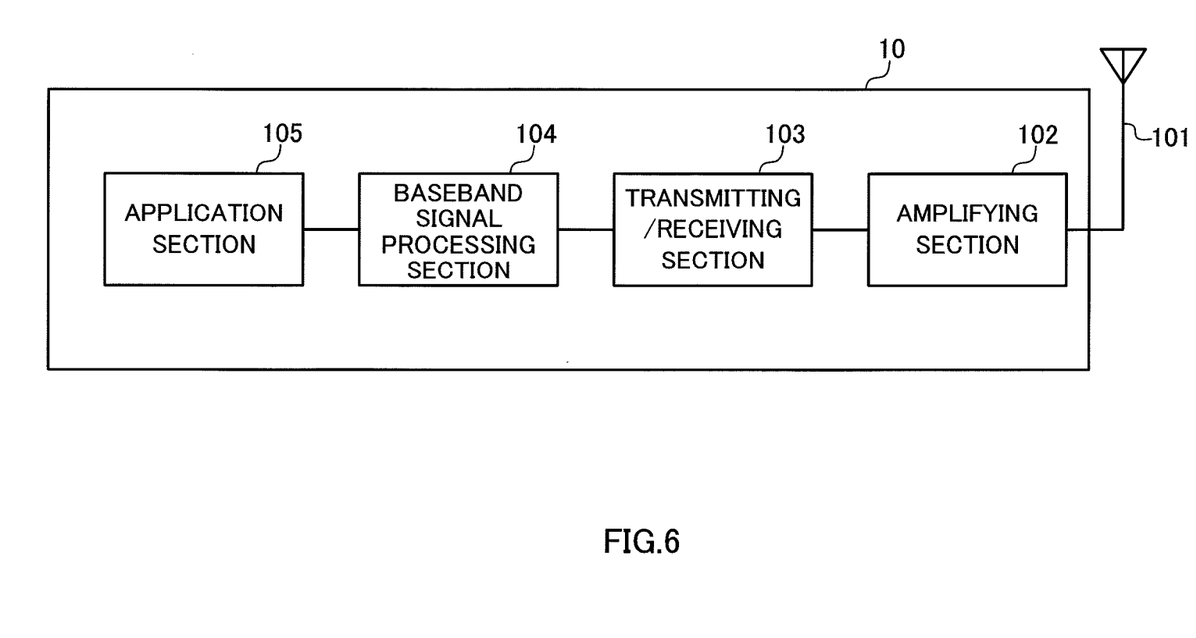
FIG. 6 is a diagram to explain an overall structure of a user terminal.

A transmission signal that is transmitted from the base station apparatus 20 is received in the transmitting/receiving antenna 101 shown in FIG. 6, and output to the CP removing section 301. The CP removing section 301 removes the CPs from the received signal and outputs the signal to the FFT section 302. The FFT section 302 applies a fast Fourier transform (FFT) to the signal, from which the CPs have been removed, and converts the signal from a time domain signal to a frequency domain signal. The FFT section 302 outputs the signal having been converted into a frequency domain signal to the downlink channel demultiplexing section 303.

The downlink channel demultiplexing section 303 separates the downlink channel signal into the downlink control information, the downlink transmission data, and the CSI-RSs. The downlink channel demultiplexing section 303 outputs the downlink control information to the downlink control information receiving section 304, outputs the downlink transmission data and the higher control information to the downlink transmission data receiving section 305, outputs the interference measurement CSI-RS to the interference signal estimation section 306, and outputs the desired signal measurement CSI-RS to the channel estimation section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. At this time, the downlink transmission data receiving section 305 specifies the desired signal measurement RE (SMR) and the interference measurement RE (IMR) based on resource information included in the higher control information. The downlink transmission data receiving section 305 demodulates the user data excluding the desired signal measurement RE and the interference measurement RE. Also, the downlink transmission data receiving section 305 outputs the higher control information included in the downlink transmission data to the determining section 309, the interference signal estimation section 306 and the channel estimation section 307.

The determining section 309 determines the CSI processes configured in the base station apparatus. When the CSI processes are reported implicitly, the determining section 309 determines the CSI processes that are associated with, for example, CSI process indices, the priorities of CSI processes, CC indices, the priorities of CC indices, reporting types and/or information related to the priorities of CSI processes, as the CSI processes configured in the base station apparatus. The determining section 309 outputs information about the CSI processes configured in the base station apparatus to the CSI feedback processing section 308.

The interference signal estimation section 306 estimates (measures) interference signals in the interference measurement RE based on information about transmission parameters and so on included in higher control information (or the downlink control information). The interference signal estimation section 306 can measure interference signals and average the measurement results over all resource blocks. The interference signal estimation section 306 reports the averaged interference signal estimation result to the CSI feedback processing section 308.

The channel estimation section 307 specifies the desired signal measurement RE (CSI-RS resource) based on information of transmission parameters and so on included in the higher control information (or downlink control information), and estimates (measures) desired signals in the desired signal measurement RE. The channel estimation section 307 reports channel estimation value to the CSI feedback processing section 308.

The CSI feedback processing section 308 calculates CSI based on the interference estimation result reported from the interference signal estimation section 306, the channel estimation result reported from the channel estimation section 307, the feedback mode, and the CSI processes configured in the base station apparatus. Note that the feedback mode may be configured with one of wideband CQI, subband CQI and best-M average. The CSI calculated in the CSI feedback processing section 308 is reported to the base station apparatus 20 as feedback information.

In the radio communication system having the above structure, under the circumstance where a plurality of CSI processes are configured, the base station apparatus configures CSI processes for requesting the CSI using the nearest CSI reference resource in a subframe that is four or more subframes before a subframe identified by the subframe number, and the user terminal determines the CSI processes configured in the base station apparatus, and performs the CSI feedback process based on this determination. By this means, it is possible to lighten the processing load for calculating a plurality of kinds of CSI, and also prevent the deterioration of throughput performance with respect to specific CSI processes.

The present invention is by no means limited to the above embodiment and can be implemented in various modifications. For example, it is possible to adequately change the positions to set CSI-RSs, the positions to set muting (zero-power), the number of processing sections, the process steps, the number of CSI-RSs, the number of muting and the number of transmission points in the above description, without departing from the scope of the present invention.

Also, although cases have been explained with the above description where a plurality of transmission points are a plurality of base station apparatuses, a transmission point may be an antenna as well. Besides, the present invention can be implemented with various changes, without departing from the scope of the present invention.

The disclosure of Japanese Patent Application No. 2012-221586, filed on Oct. 3, 2012, including the specification, drawings and abstract, is incorporated herein by reference in its entirety.

The invention claimed is:

1. A radio communication system in which a plurality of channel state information (CSI) processes, which each are a combination of a signal measurement resource and an interference measurement resource, are configured, the radio communication system comprising:
a plurality of base station apparatus that transmits a channel state information reference signal (CSI-RS) for measuring a channel state; and
a Rel. 10 LTE terminal and a Rel. 11 LTE terminal that communicate with the plurality of base station apparatus, wherein
the base station apparatus configures the Rel. 10 LTE terminal with a CSI reference resource in a subframe that is four or more subframes prior to and is nearest to a CSI feedback subframe,
the base station apparatus configures the Rel. 11 LTE terminal with a CSI reference resource in a subframe that is four or more subframes prior to and is nearest to a CSI feedback subframe and with a CSI reference resource in a subframe that is more than four subframes prior to and is nearest to the CSI feedback subframe,
the Rel. 10 LTE terminal performs a feedback process of CSI obtained using the CSI reference resource in the subframe that is four or more subframes prior to and is nearest to the CSI feedback subframe, and
the Rel. 11 LTE terminal performs a feedback process of CSI obtained using the CSI reference resource in the subframe that is four or more subframes prior to and is nearest to the CSI feedback subframe and performs a feedback process of CSI obtained using the CSI reference resource in the subframe that is more than four subframes prior to and is nearest to the CSI feedback subframe.

2. The radio communication system according to claim 1, wherein in coordinated multi-point (CoMP) transmission, the base station apparatus configures the Rel. 11 LTE terminal with the plurality of CSI processes.

3. The radio communication system according to claim 2, wherein the base station apparatus determines a CSI process based on capability information about a number of CSI processes for obtaining the CSI using the CSI reference resource in the subframe that is four or more subframes prior to and is nearest to the CSI feedback subframe.

4. The radio communication system according to claim 2, wherein the base station apparatus reports the CSI processes to the Rel. 11 LTE terminal.

5. The radio communication system according to claim 2, wherein the base station apparatus reports the CSI processes to the Rel. 11 LTE terminal through higher layer signaling or dynamic signaling.

6. The radio communication system according to claim 1, wherein the base station apparatus determines a CSI process based on capability information about a number of CSI processes for obtaining the CSI using the CSI reference resource in the subframe that is four or more subframes prior to and is nearest to the CSI feedback subframe.

7. The radio communication system according to claim 6, wherein the base station apparatus reports the CSI processes to the Rel. 11 LTE terminal.

8. The radio communication system according to claim 6, wherein the base station apparatus reports the CSI processes to the Rel. 11 LTE terminal through higher layer signaling or dynamic signaling.

9. The radio communication system according to claim 1, wherein the base station apparatus reports the CSI processes to the Rel. 11 LTE terminal.

10. The radio communication system according to claim 1, wherein the base station apparatus reports the CSI processes to the Rel. 11 LTE terminal through higher layer signaling or dynamic signaling.

11. A base station apparatus in a radio communication system in which the base station apparatuses that transmits a channel state information reference signal (CSI-RS) for measuring a channel state and communicates with a Rel. 10 LTE terminal and a Rel. 11 LTE terminal, and in which a plurality of channel state information (CSI) processes, which each are a combination of a signal measurement resource and an interference measurement resource, are configured, wherein:
the base station apparatus configures the Rel. 10 LTE terminal with a CSI reference resource in a subframe that is four or more subframes prior to and is nearest to a CSI feedback subframe, and
the base station apparatus configures the Rel. 11 LTE terminal with a CSI reference resource in a subframe that is four or more subframes prior to and is nearest to a CSI feedback subframe and with a CSI reference resource in a subframe that is more than four subframes prior to and is nearest to the CSI feedback subframe.

12. The base station apparatus according to claim 11, wherein in coordinated multi-point (CoMP) transmission, the base station apparatus configures the Rel. 11 LTE terminal with the plurality of CSI processes.

13. The base station apparatus according to claim 11, wherein the base station apparatus determines a CSI process based on capability information about a number of CSI processes for obtaining the CSI using the CSI reference resource in the subframe that is four or more subframes prior to and is nearest to the CSI feedback subframe.

14. The base station apparatus according to claim 11, wherein the base station apparatus reports the CSI processes to the Rel. 11 LTE terminal.

15. The base station apparatus according to claim 11, wherein the base station apparatus reports the CSI processes to the Rel. 11 LTE terminal through higher layer signaling or dynamic signaling.

16. A user terminal in a radio communication system which includes a base station apparatus that transmits a channel state information reference signal (CSI-RS) for measuring a channel state, and a Rel. 10 LTE terminal and a Rel. 11 LTE terminal that communicate with the base station apparatus, and in which a plurality of channel state information (CSI) processes, which each are a combination of a signal measurement resource and an interference measurement resource, are configured, wherein:
the user terminal is the Rel. 11 LTE terminal, and
the user terminal performs a feedback process of CSI obtained using the CSI reference resource in a subframe that is four or more subframes prior to and is nearest to a CSI feedback subframe and performs a feedback process of CSI obtained using the CSI reference resource in a subframe that is more than four subframes prior to and is nearest to the CSI feedback subframe.

17. A radio communication method in a radio communication system which includes a base station apparatus that transmits a channel state information reference signal (CSI-RS) for measuring a channel state, and a Rel. 10 LTE terminal and a Rel. 11 LTE terminal that communicate with the base station apparatus, and in which a plurality of channel state information (CSI) processes, which each are a combination of a signal measurement resource and an interference measurement resource, are configured, the radio communication method comprising:

configuring, in the base station apparatus, the Rel. 10 LTE terminal with a CSI reference resource in a subframe that is four or more subframes before prior to and is nearest to a CSI feedback subframe;

configuring, in the base station apparatus, the Rel. 11 LTE terminal with a CSI reference resource in a subframe that is four or more subframes prior to and is nearest to a CSI feedback subframe and with a CSI reference resource in a subframe that is more than four subframes prior to and is nearest to the CSI feedback subframe, performing, in the Rel. 10 LTE terminal, a feedback process of CSI obtained using the CSI reference resource in the subframe that is four or more subframes prior to and is nearest to the CSI feedback subframe, and performing, in the Rel. 11 LTE terminal, a feedback process of CSI obtained using the CSI reference resource in the subframe that is four or more subframes prior to and is nearest to the CSI feedback subframe and performs a feedback process of CSI obtained using the CSI reference resource in the subframe that is more than four subframes prior to and is nearest to the CSI feedback subframe.

18. The radio communication method according to claim 17, wherein in coordinated multi-point (CoMP) transmission, the base station apparatus configures the Rel. 11 LTE terminal with the plurality of CSI processes.

19. The radio communication method according to claim 17, wherein the base station apparatus determines a CSI process based on capability information about a number of CSI processes for obtaining the CSI using the CSI reference resource in the subframe that is four or more subframes prior to and is nearest to the CSI feedback subframe.

* * * * *